US012048938B2

(12) United States Patent
Peterson

(10) Patent No.: US 12,048,938 B2
(45) Date of Patent: Jul. 30, 2024

(54) SHOWERHEAD WITH MASSAGE ENGINE

(71) Applicant: WATER PIK, INC., Fort Collins, CO (US)

(72) Inventor: Preston Peterson, Fort Collins, CO (US)

(73) Assignee: WATER PIK, INC., Fort Collins, CO (US)

( * ) Notice: Subject to any disclaimer, the term of this patent is extended or adjusted under 35 U.S.C. 154(b) by 409 days.

(21) Appl. No.: 17/480,002

(22) Filed: Sep. 20, 2021

(65) Prior Publication Data

US 2023/0089835 A1 Mar. 23, 2023

(51) Int. Cl.
*B05B 1/18* (2006.01)
*B05B 1/08* (2006.01)
*B05B 3/04* (2006.01)

(52) U.S. Cl.
CPC ................ *B05B 1/18* (2013.01); *B05B 1/083* (2013.01); *B05B 3/0486* (2013.01)

(58) Field of Classification Search
CPC ..... B05B 1/083; B05B 1/1636; B05B 1/1645; B05B 1/1654; B05B 1/169; B05B 1/18; B05B 1/185; B05B 3/0486
See application file for complete search history.

(56) References Cited

U.S. PATENT DOCUMENTS 4,239,409 A * 12/1980 Osrow ...................... B05B 3/04 401/281
7,114,666 B2 * 10/2006 Luettgen ............... B05B 1/1654 239/443
9,067,218 B2 * 6/2015 Yu ......................... B05B 3/0427
9,610,594 B2 4/2017 Chan et al.
9,844,787 B2 12/2017 Zhou et al.
9,895,701 B2 * 2/2018 Tian .......................... B05B 3/04
2011/0114754 A1 * 5/2011 Li ............................ B05B 1/18 239/222.11
2012/0181353 A1 * 7/2012 Zhou ......................... B05B 3/04 239/101
2013/0199641 A1 * 8/2013 Zhou ..................... B05B 1/1609 137/624.27
2017/0274395 A1 * 9/2017 Xu ............................ B05B 3/04
2018/0169675 A1 * 6/2018 Yu ......................... B05B 3/0431
2018/0318853 A1 11/2018 Lin et al.
2019/0039079 A1 * 2/2019 Lin ......................... B05B 12/04
2019/0091705 A1 3/2019 Westgate et al.
2019/0143348 A1 * 5/2019 Quinn ................... B05B 1/1636 239/562
2022/0105526 A1 * 4/2022 Hofman .................... B05B 3/04

FOREIGN PATENT DOCUMENTS

WO WO-2020191523 A1 * 10/2020 ............... B05B 1/08

* cited by examiner

*Primary Examiner* — Darren W Gorman

(57) ABSTRACT

A showerhead with a massage engine is disclosed. The showerhead may include a housing defining a chamber in fluid communication with a fluid inlet and a massage mode assembly received within the chamber. The massage mode assembly may include a drive gear comprising a plurality of drive teeth, wherein the drive gear rotates due to fluid from the fluid inlet impacting the drive gear, and a driven gear comprising a plurality of driven teeth that mesh with the drive teeth of the drive gear, such that movement of the drive gear causes the driven gear to rotate, wherein the drive gear rotates faster than the driven gear rotates to selectively direct fluid from the fluid inlet to one or more nozzles.

15 Claims, 10 Drawing Sheets

SHOWERHEAD WITH MASSAGE ENGINE

TECHNICAL FIELD

One or more embodiments of the present disclosure relate generally showerheads, and more specifically, to pulsating or massaging showerheads.

BACKGROUND

Showerheads, whether fixed or handheld, typically offer a variety of different spray patterns to the user, e.g., a full body spray with wide spray cone, a mist mode, and/or a massage mode with a concentrated and pulsating spray. Many consumers desire a forceful massage in order to have a better and therapeutic experience, but conventionally massage modes can be limited in the amount of force delivered based on water pressure and flow rates. As such, there is a need in the art for a showerhead with a massage mode providing a different massage experience, such as increased force, variable force, variable frequency of pulses, or any combination thereof, with the same inlet water flow rate or water pressure.

SUMMARY

According to one or more embodiments of the present disclosure, a showerhead is disclosed that includes a housing defining a chamber in fluid communication with a fluid inlet; and a massage mode assembly received within the chamber including: a drive gear comprising a plurality of a drive teeth, wherein the drive gear rotates due to fluid from the fluid inlet impacting the drive teeth; and a driven gear comprising a plurality of driven teeth that mesh with the drive teeth of the drive gear, such that movement of the drive gear causes the driven gear to rotate, wherein the drive gear rotates faster than the driven gear rotates to selectively direct fluid from the fluid inlet to one or more nozzles.

According to embodiments of the present disclosure, a drive gear for the showerhead may include a plurality of paddles, where the fluid from the fluid inlet impacts both the drive teeth and the plurality of paddles to rotate the drive gear.

According to one or more embodiments of the present disclosure, the plurality of paddles that may be included on the drive gear may be shaped different from drive teeth on the drive gear. According to one or more embodiments of the present disclosure, fluid impacts the plurality of paddles on the drive gear and the drive teeth from a first massage mode inlet.

According to one or more embodiments of the present disclosure, a rotational axis of a drive gear may be offset from a center axis of the chamber and a rotational axis of the driven gear is aligned with a center axis of the chamber.

According to one or more embodiments of the present disclosure, the driven gear of the showerhead may be concentric relative to a center axis of the chamber and the drive gear may not be concentric relative to the center axis of the chamber.

According to one or more embodiments of the present disclosure, a cover may define one or more nozzles and may include a center axis aligned or that is the same as the center axis of the chamber.

According to one or more embodiments of the present disclosure, a portion of the drive gear is positioned vertically above and extends laterally over a portion of the driven gear.

According to one or more embodiments of the present disclosure, a portion of the drive gear is positioned in plane with a portion of the driven gear and a portion of the drive gear is positioned out of plane with the driven gear.

According to one or more embodiments of the present disclosure, driven teeth of the driven gear are in a same plane as the drive teeth of the drive gear.

According to one or more embodiments of the present disclosure, a cover is included that has one or more nozzles and the drive gear as a rotational axis offset from a center axis of the cover.

According to one or more embodiments of the present disclosure, a cam is connected to the driven gear and a shutter is connected to the cam, and as the driven gear rotates, the cam rotates, causing the shutter to open and close the one or more nozzles.

According to one or more embodiments of the present disclosure, a housing may include one or more flow directing plates positioned within the chamber and a driven gear is defined by the one or more flow directing plates, where the drive gear is contained within the driven gear chamber.

According to one or more embodiments of the present disclosure, a mode selector is positioned between the fluid inlet and the massage mode assembly. The mode selector directs fluid from the fluid inlet into the massage mode assembly, in a first configuration the mode selector directs fluid at a first orientation relative to the drive gear causing the drive gear to rotate in a first direction and in a second configuration, the mode selector directs fluid at both a second orientation relative to the drive gear and at the first orientation relative to the drive gear, causing the drive gear to rotate in the first direction at a rate less than in the first configuration.

According to one or more embodiments of the present disclosure, in a third configuration, the mode selector directs fluid at the second orientation relative to the drive gear, causing the drive gear to rotate in a second direction, opposite the first direction.

According to one or more embodiments of the present disclosure, a massage mode assembly further comprises a massage mode housing comprising a first inlet and a second inlet, wherein the first inlet has a first cross-sectional shape and the second inlet has a second cross-sectional shape different from the first cross-sectional shape According to one or more embodiments of the present disclosure, a showerhead is disclosed that includes a housing defining a housing center axis and in fluid communication with a fluid inlet; an engine positioned within the housing and in fluid communication with the fluid inlet, the engine including: a drive gear configured to be rotated along a first rotational axis offset from the housing center axis; a driven gear coupled to the drive gear and configured to be rotated along a second rotational axis, different from the first rotational axis; a nozzle plate coupled to the engine and in fluid communication therewith, the nozzle plate comprising a plurality of massage mode nozzles; wherein in a first mode, fluid from the fluid inlet, impacts the drive gear, causing the drive gear to rotate selectively directing fluid from the fluid inlet to one or more of the plurality of massage mode nozzles.

According to one or more embodiments of the present disclosure, a drive gear includes a plurality of paddles and a plurality of drive gear teeth and a driven gear includes a plurality of driven gear teeth that mesh with the drive gear teeth, and in a first mode the fluid from the fluid inlet impacts the paddles to rotate the drive gear.

According to one or more embodiments of the present disclosure, in a first mode, the fluid from the fluid inlet impacts the paddles and the plurality of drive gear teeth.

According to one or more embodiments of the present disclosure, paddles of the drive gear extend over a portion of the driven gear.

According to one or more embodiments of the present disclosure, a drive gear is laterally offset from a driven gear and arranged to extend vertically above a top surface of the driven gear.

According to one or more embodiments of the present disclosure, an engine may include a cam connected to the driven gear and a shutter connected to the cam, where the driven gear causes the cam to rotate, which moves the shutter to fluidly connect and disconnect one or more nozzles of the plurality of spray nozzles from the fluid inlet.

According to one or more embodiments of the present disclosure, the nozzle plate includes a plurality of spray mode nozzles and in a second mode, fluid from the fluid inlet is directed to the plurality of spray mode nozzles.

According to one or more embodiments of the present disclosure, in a first mode, fluid from the fluid inlet impacts a drive gear at a first orientation, causing the drive gear to rotate in a first direction at a first rotational rate and in a third mode a portion of the fluid from the fluid inlet impacts the drive gear at a second orientation, causing the drive gear to rotate in the first direction at a second rotational rate, slower than the first rotational rate.

According to one or more embodiments of the present disclosure, a showerhead is disclosed that includes a housing having a fluid inlet; and a massage mode assembly in fluid communication with the fluid inlet and positioned within the housing, the massage mode assembly including: a turbine configured to rotate as fluid from the fluid inlet impacts the turbine; and a mode selector positioned between the turbine and the fluid inlet, wherein: the mode selector is configured to direct the fluid from the fluid inlet to the turbine; in a first mode the mode selector directs the fluid from the fluid inlet to the turbine causing the turbine to rotate in a first direction and at a first rotational rate; and in a second mode, the mode selector directs a portion of the fluid from the fluid inlet to the turbine causing the turbine to rotate in the first direction and a second rotational rate slower than the first rotational rate.

According to one or more embodiments of the present disclosure, a turbine includes a plurality of drive teeth and the massage mode assembly includes a driven gear having a plurality of driven teeth that mesh with the drive teeth of the turbine, such that movement of the turbine causes the driven gear to rotate.

According to one or more embodiments of the present disclosure, the mode selector is configured to continuously adjust the fluid from the fluid inlet to the turbine as the mode selector transitions between the first mode and the second mode.

Additional features are set forth in part in the description that follows and will become apparent to those skilled in the art upon examination of the specification and drawings or may be learned by the practice of the disclosed subject matter. A further understanding of the nature and advantages of the present disclosure may be realized by reference to the remaining portions of the specification and the drawings, which forms a part of this disclosure.

One of skill in the art will understand that each of the various aspects and features of the disclosure may advantageously be used separately in some instances, or in combination with other aspects and features of the disclosure in other instances. Accordingly, individual aspects can be claimed separately or in combination with other aspects and features. Thus, the present disclosure is merely exemplary in nature and is in no way intended to limit the claimed invention or its applications or uses. It is to be understood that structural and/or logical changes may be made without departing from the spirit and scope of the present disclosure.

The present disclosure is set forth in various levels of detail and no limitation as to the scope of the claimed subject matter is intended by either the inclusion or non-inclusion of elements, components, or the like in this summary. In certain instances, details that are not necessary for an understanding of the disclosure or that render other details difficult to perceive may have been omitted. Moreover, for the purposes of clarity, detailed descriptions of certain features will not be discussed when they would be apparent to those with skill in the art so as not to obscure the description of the present disclosure. The claimed subject matter is not necessarily limited to the arrangements illustrated herein, with the scope of the present disclosure is defined only by the appended claims.

BRIEF DESCRIPTION OF THE DRAWINGS

The description will be more fully understood with reference to the following figures in which components may not be drawn to scale, which are presented as various embodiments of the showerhead described herein and should not be construed as a complete depiction of the scope of the showerhead.

Embodiments of the disclosure and their advantages are best understood by referring to the detailed description that follows. It should be appreciated that like reference numerals may be used to identify like elements illustrated in one or more of the figures.

DETAILED DESCRIPTION

According to the present disclosure, a showerhead with a pulsating or massage mode is disclosed. The showerhead is configured to have a reduced massage pulse frequency that allows for stronger or more forceful "pulses" of water that impact the user. In one example, the showerhead includes a massage mode assembly that utilizes a gear reduction, such as via a drive gear or first gear, and a driven gear or second gear, where the driven gear rotates slower than the drive gear in order to reduce an oscillation rate of a shutter that blocks/unblocks nozzles from a water flow (e.g., water from an inlet into the showerhead). The reduced oscillation or movement rate, allows a higher force from the same water pressure and flow rates, as compared to conventional massage modes in showerheads, which can enhance the user experience and provide better massaging effect to the user.

The drive gear may be rotated by being impacted by water and may optionally include paddles or additional impact surfaces that assist in rotating the drive gear, e.g., by increasing the torque. The driven gear may be coupled, either directly or indirectly, to a shutter, in some instances the coupling may be via a cam, which causes the shutter to oscillate due to rotational movement of the driven gear.

In some instances, the pulse frequency of the massage mode assembly may be adjustable, e.g., the driven gear may be configured to rotate at two or more speeds and/or in different directions. For example, the massage mode assembly may be configured to direct water at two different angles or orientations onto the drive gear, where the second orientation may counteract a rotation in a first direction, causing the drive gear to rotate slower. In some embodiments, the massage mode assembly may have differently shaped and/or sized inlets to direct water to the drive gear, which can further change the speed of rotation of the drive gear. In this manner, the showerhead can provide multiple massage intensities through the same outlet nozzles.

Figure 1A:
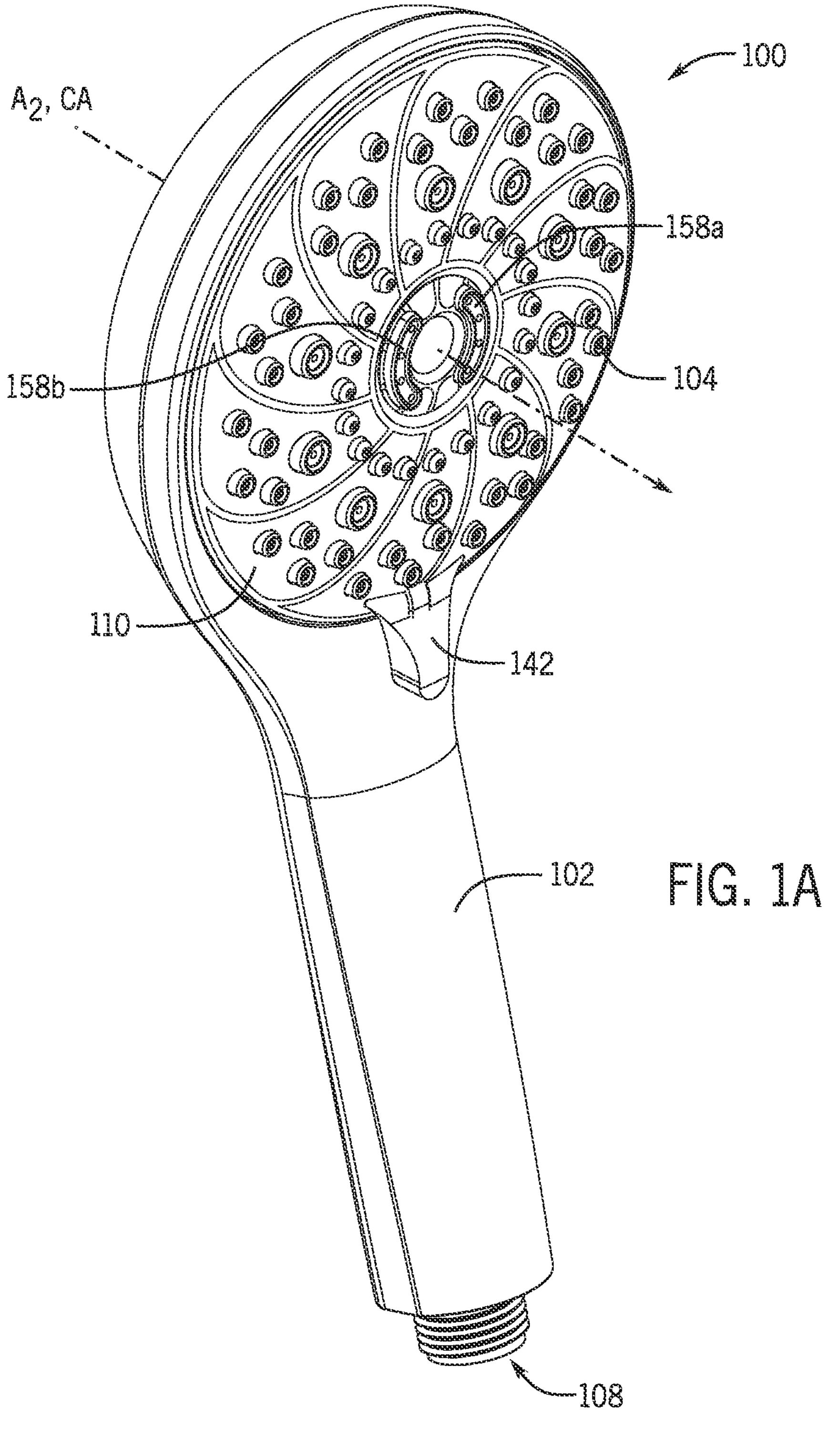
FIG. 1A is a front isometric view of a showerhead in accordance with an embodiment of the disclosure.
Figure 1B:
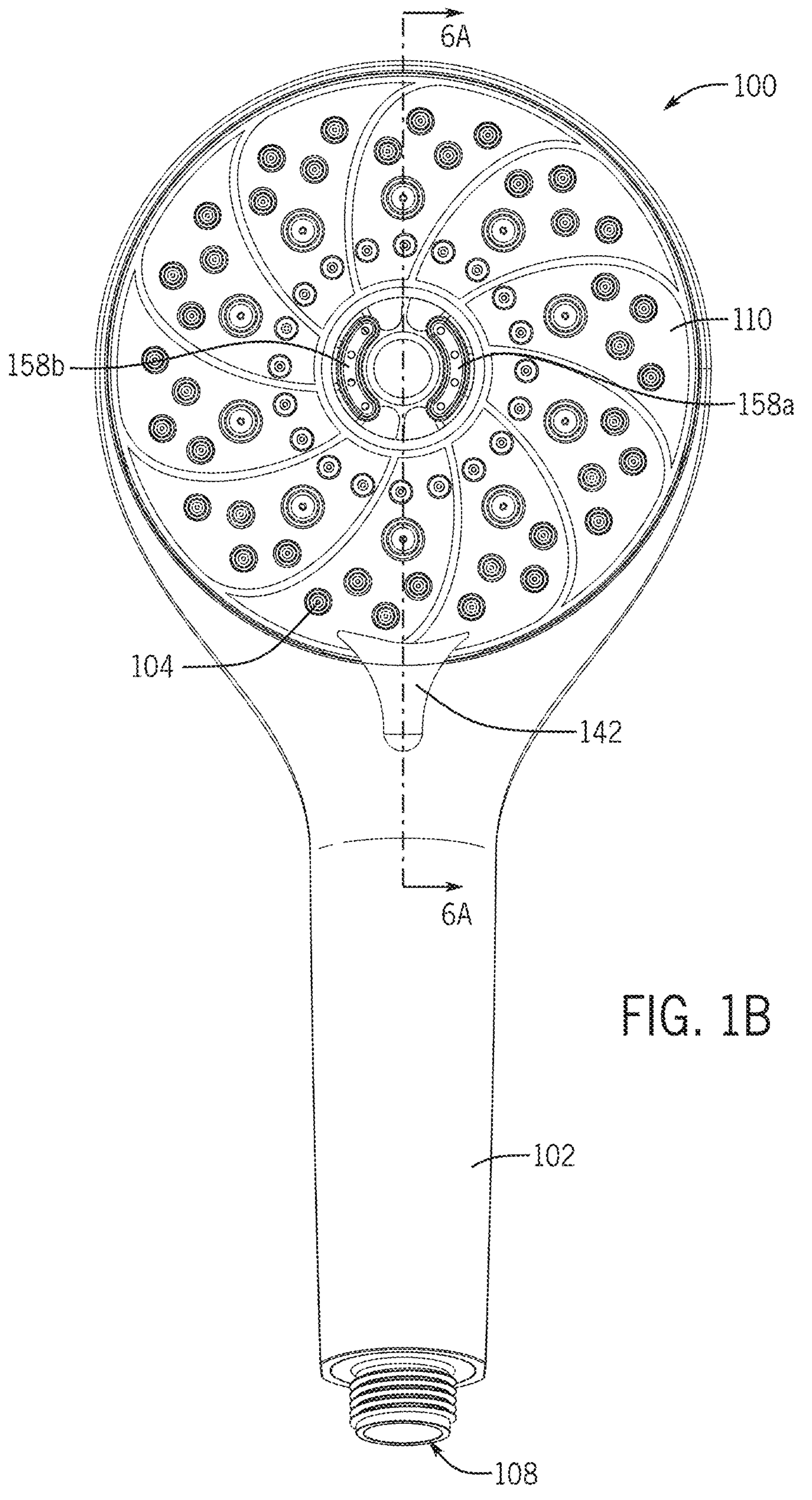
FIG. 1B is a front elevation view of a showerhead in accordance with an embodiment of the disclosure.
Figure 1C:
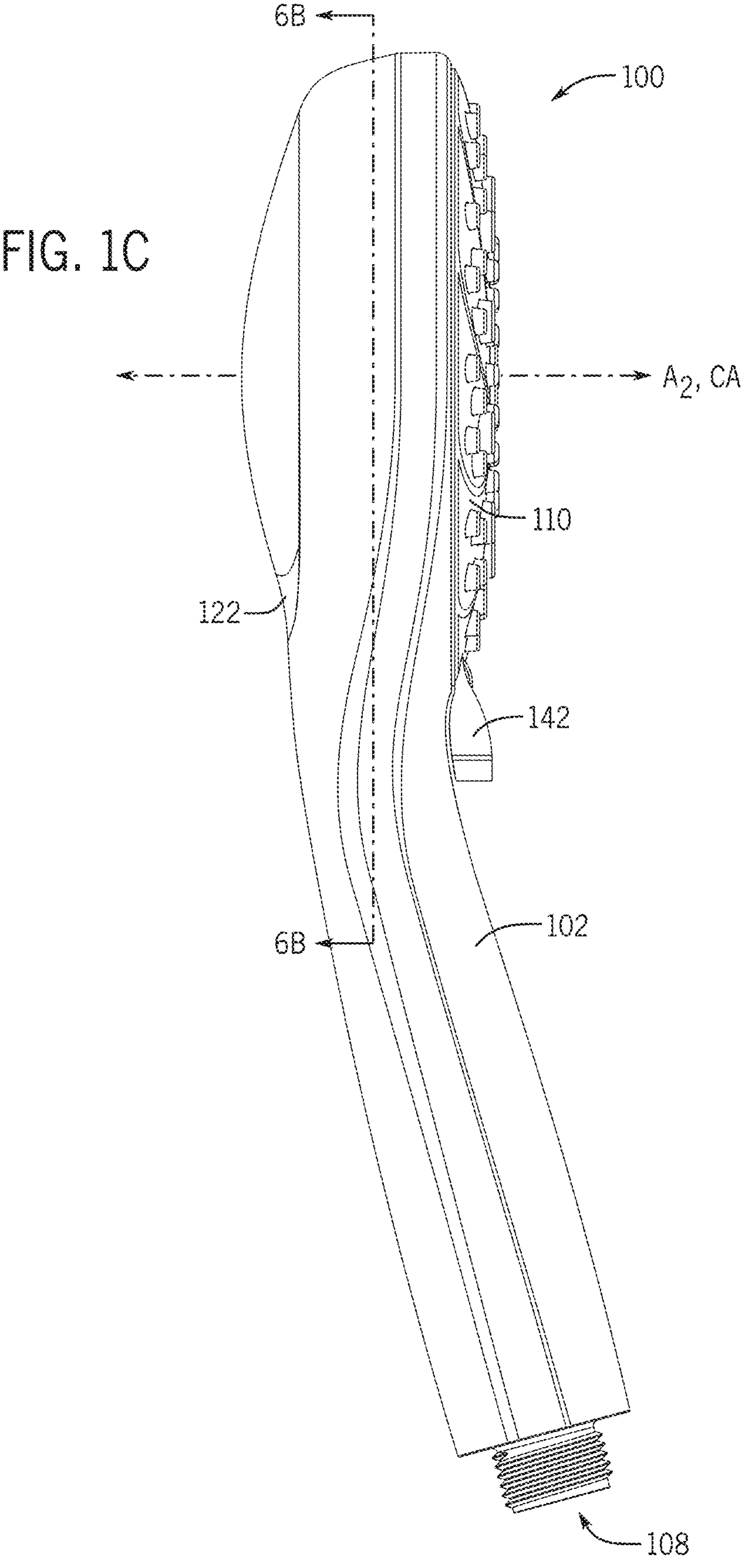
FIG. 1C is a side elevation view of a showerhead in accordance with an embodiment of the disclosure.

With reference to FIG. 1A-1C, a showerhead 100 is disclosed. The showerhead 100 includes a cover 110, defining a spray face for the showerhead 100 and which may include massage nozzles 158*a*, 158*b* and optionally one or more other nozzles, such as spray nozzles 104. In some embodiments, such as when the showerhead 100 may be configured as a handheld showerhead, the showerhead 100 may include a handle 102, which may be coupled to the showerhead 100 and used to allow a user to manipulate the showerhead 100, e.g., direct spray more accurately over a desired location on the user's body. The handle 102 may also act to couple the showerhead 100 to a surface, such as via a cradle mount or the like. As such, the handle 102 may be formed as an elongated member that defines a gripping surface for a user. In other embodiments, the showerhead 100 may omit the handle and can be configured to mount directly to a wall or surface, e.g., a fixed mount.

The showerhead 100 includes a water inlet 108, which can be fluidly coupled to a water source, such as a plumbing outlet or the like. In embodiments where the showerhead 100 is a handheld showerhead 100, the water inlet 108 may be formed on the bottom of the handle 102 and include threading to couple to a hose or other flexible fluid connector, but in other embodiments, the water inlet 108 may be formed in other locations, e.g., on a back surface of the shower head and directly couple to a fluid outlet in a wall or other surface.

Figure 2A:
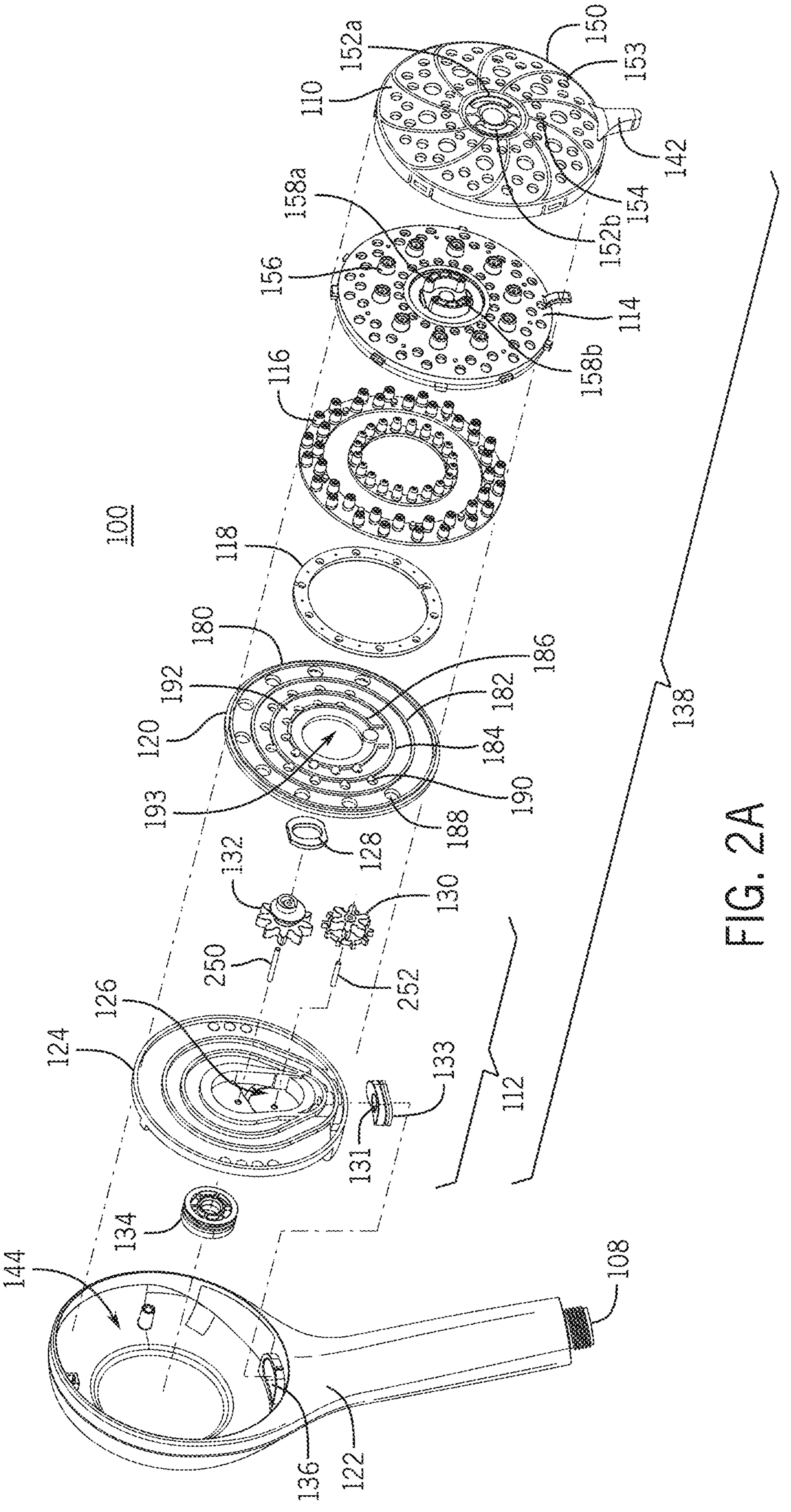
FIG. 2A is a front exploded view of the showerhead in accordance with an embodiment of the disclosure.
Figure 2B:
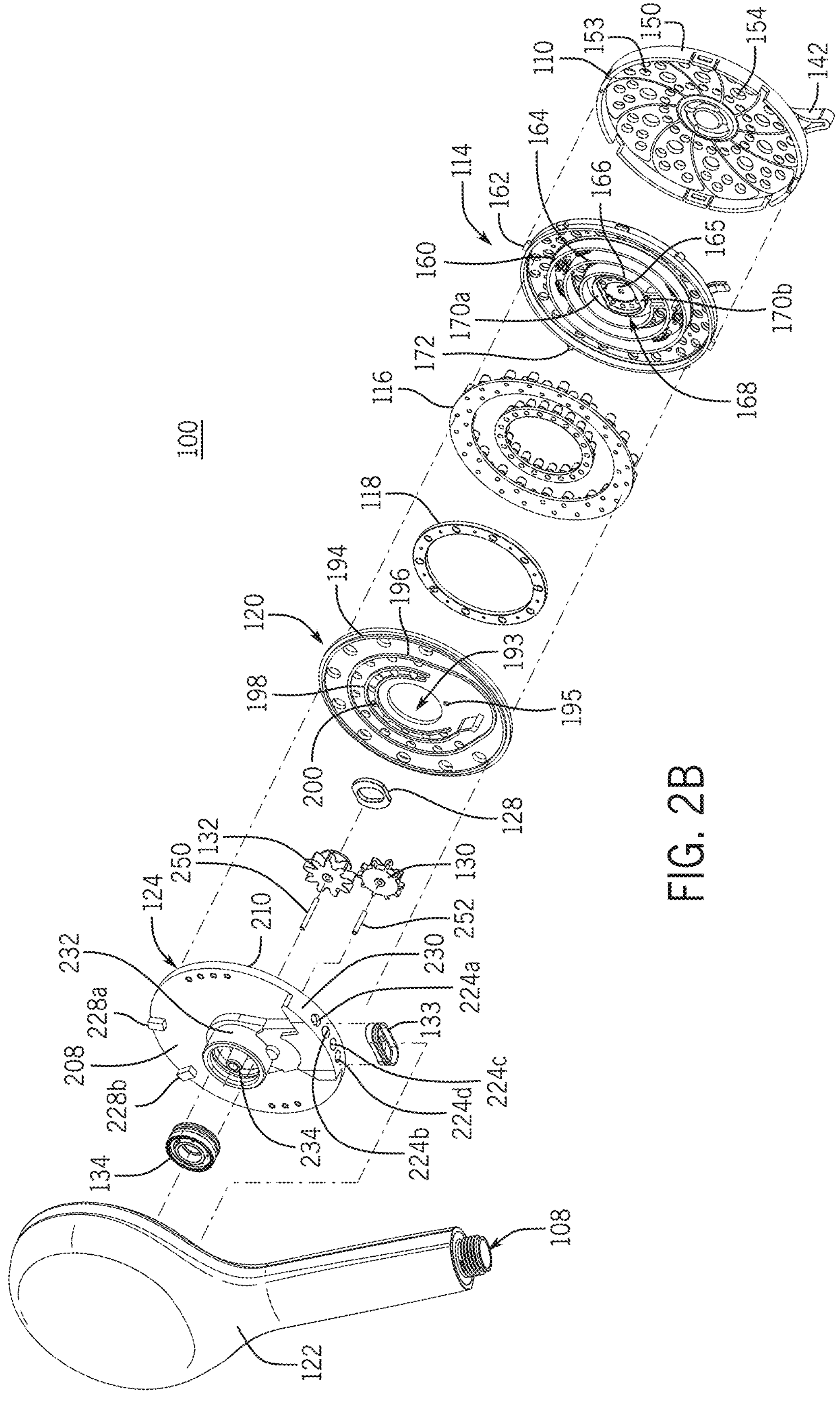
FIG. 2B is a rear exploded view of the showerhead in accordance with an embodiment of the disclosure.

FIGS. 2A and 2B illustrate exploded views of the showerhead 100 from front and rear perspectives, respectively. With reference to FIGS. 2A and 2B, the showerhead 100 may include a housing 122, which defines the exterior of the showerhead 100 and may enclose or partially enclose one or more components of the showerhead 100. The housing 122 may include the handle 102. The housing 122 may define an engine compartment 144 configured to receive components of an engine 138. An engine inlet 136 may be defined within the housing 122 and in fluid communication with the water inlet 108.

A handle ring 134 may be used to couple the housing 122 to the engine 138, such as to ensure a tight fit between the two components, but allow the engine 138 to rotate relative to the housing 122. In other embodiments, the handle ring 134 may be omitted.

The engine 138 defines the spray patterns, such as the massage features, for the showerhead 100, as well as delivers water from the engine inlet 136 out of the showered 100. The engine 138 may be received within the engine compartment 144 of the housing 122. The engine 138 may include one or more flow directing or spray plates that define flow pathways for fluid within the showerhead 100. The flow pathways may be in fluid communication with one or more nozzle groups to define different spray patterns or mode. The configuration, number, and features of the flow directing or spray plates may be varied depending on the number of modes and types of spray patterns for the modes of the showerhead 100. The engine 138 may be rotatable relative to the housing 122, such as to allow the engine inlet 136 to be aligned with different mode inlets that direct water flow into different pathways defined by the engine.

A cover 110 may be one of the one or more flow directing plates and may define a plurality of apertures (e.g., a first set of apertures 150, a second set of apertures 152*a*, 152*b*, and a third set of apertures 154) that correspond to and/or define nozzle outlets for the showerhead 100. The apertures 150, 152*a*, 152*b*, 154 may be differently sized, shaped, and/or positioned relative to the area of the cover 110. In one example, the second set of apertures 152*a*, 152*b* may correspond to a massage mode and may include two apertures that are arranged opposite one another and optionally may be positioned about a center axis CA of the cover 110.

The cover 110 may also include a control feature 142, such as a tab or knob, that extends laterally from a perimeter sidewall. The control feature 142 defines a gripping surface that allows a user to easily grip and manipulate the cover 110. In one example, the cover 110 may also define the front or spray surface of the showerhead.

The face plate 114 may couple to the cover 110 and be configured to be rotated therewith. For example, the face plate 114 may include a tab 141 that seats with control feature 142 on the cover 110, that helps turn the face plate 114 as the cover 110 is rotated. The face plate 114 may include nozzles that fit within one or more corresponding apertures 150, 152*a*, 152*b*, 154 of the cover 110. For example, the face plate 114 may include nozzles 156, 158*a*, 158*b* that may be defined by the plate that correspond to or otherwise fit within select apertures 150, 152*a*, 152*b*, 154 of the cover 110. For example, the face plate 114 may include massage nozzles 158*a*, 158*b* which may include a first nozzle bank 158*a* and a second nozzle bank 158*b* positioned opposite one another. The first and second nozzle banks 158*a*, 158*b* may include a plurality of massage mode outlets or nozzles and may be oriented in a curved shape, such as in opposing arcs.

Figure 3:
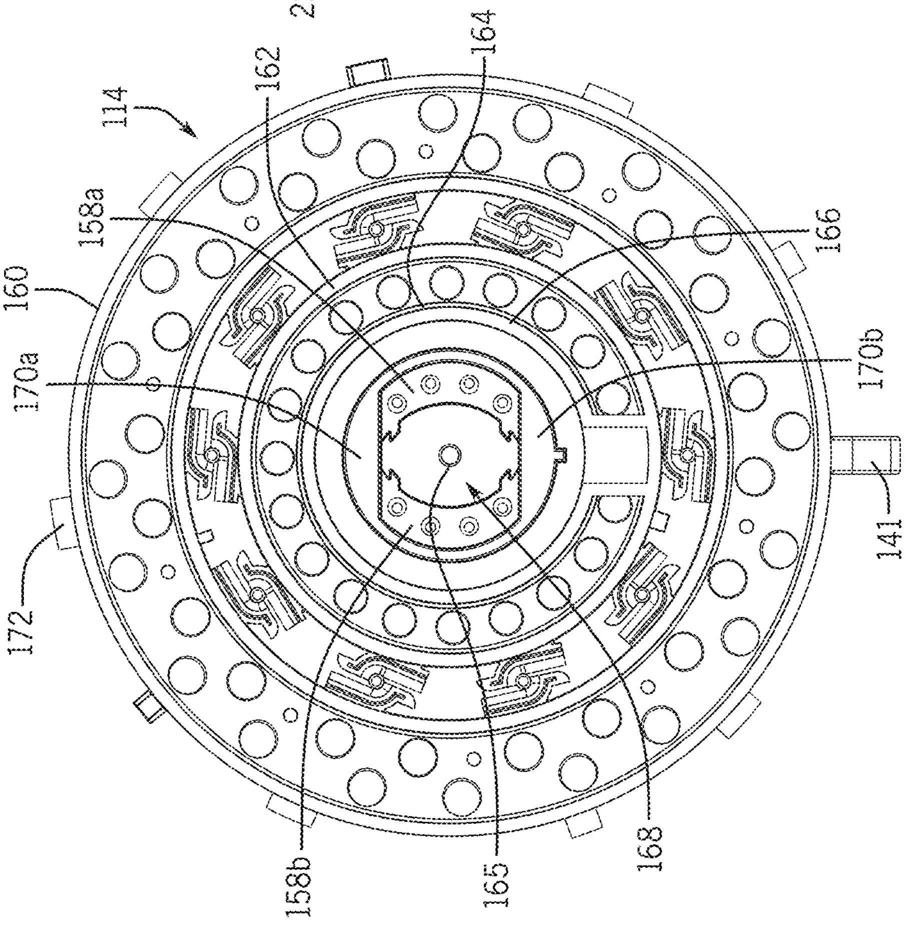
FIG. 3 is a top plan view of an face plate for the showerhead in accordance with an embodiment of the disclosure.

With reference to FIGS. 2B and 3, the face plate 114 may also include one or more walls that may define one or more fluid pathways. For example, the face plate 114 may include a first wall 160, a. second wall 162, a third wall 164, and a forth wall 166. With the first wall 160 defining an outer perimeter wall of the face plate 114, which optionally may include one or more securing features 172, that can couple the face plate 114 to the cover 110. The second wall 162 may be spaced inwards of the first wall 162, with the third wall 164 and the fourth wall 166 spaced radially inwards from the first wall 162, with the fourth wall 166 being closest to a center axis CA of the face plate 114. The fourth wall 166 may define a portion of a massage mode chamber 168, which may be defined in a central region of the face plate 114. One or more constraining walls 170*a*, 170*b* may extend radially inwards from an interior surface of the fourth wall 166 so as to extend into the massage mode chamber 168. As will be discussed in more detail below, the constraining walls 170*a*, 170*b* may function as a track, curb, or constraint to direct motion of components of the massage mode assembly.

A pin support 165, which may be defined as a recess, is positioned on an interior surface of the face plate 114. For example, the pin support 165 may be defined as a recess located at a center of the face plate 114 between the two constraining walls 170*a*, 170*b* and aligned with the center axis CA.

With continued reference to FIGS. 2A and 2B, the showerhead 100 may also include one or more nozzle rings 116, which may be inserted into the cover 110 and/or face plate 114 to define one or more nozzle types or specific nozzles. In one example the nozzle rings 116 may be formed of a soft or flexible material, e.g., rubber, to allow the nozzles to flex, to help assist it the removal of debris, such as a buildup, from the showerhead 100. It should be noted that the nozzles of the showerhead may be formed solely by one or more of the plates or a combination of plates and/or nozzle ring 116.

Similarly, the showerhead 100 may also include a mist plate 118, which may include smaller of specifically shaped apertures that help to define a mist pattern as a mode option.

With reference to FIG. 2A, the showerhead 100 may include an intermediate plate 120 that couples to the face plate 114 to define one or more mode pathways through the engine 138. The intermediate plate 120 may include a plurality of walls, which may include on a front face of the intermediate plate 120, a first wall 180, a second wall 182, a third wall 184, and a fourth wall 186, which each wall being defined radially inward from the next, e.g., the fourth wall 186 is positioned the closest to the center axis CA of the intermediate plate 120 and the first wall 180 is positioned the furthest from the center axis CA of the intermediate plate 120.

One or more flow apertures may be defined in the intermediate plate 120 that provide a fluid pathway to the face plate 114 and/or front plate 110. In one example, there may be a set of apertures for different modes of the showerhead 100, with the different sets of apertures being defined between the different walls 180, 180, 182, 184. For example, a first set of apertures 188 may be defined between the first wall 180 and the second wall 182, a second set of apertures 190 may be defined between the second wall 182 and the third wall 184, a third set of apertures 192 may be defined between the third wall 184 and the fourth wall 186. A massage aperture 194 may be defined in a center of the intermediate plate 120 and may be positioned radially inward from the fourth wall 186.

With reference to FIG. 2B, the intermediate plate 120 may also include a plurality of walls that are defined on a back surface of the intermediate plate 120. For example, the intermediate plate 120 may include a first wall 194, a second wall 196, a third wall 198, and a fourth wall 200, where the walls are spaced apart from one another and positioned progressively radially inwards from one another.

A pin support 195 may be formed on the back surface and positioned adjacent to the massage aperture 194. In one example, the pin support 195 may be defined as a recess on the back surface of the intermediate plate 120, but in other embodiments may be defined as an aperture defined through the intermediate plate 120.

Figure 4:
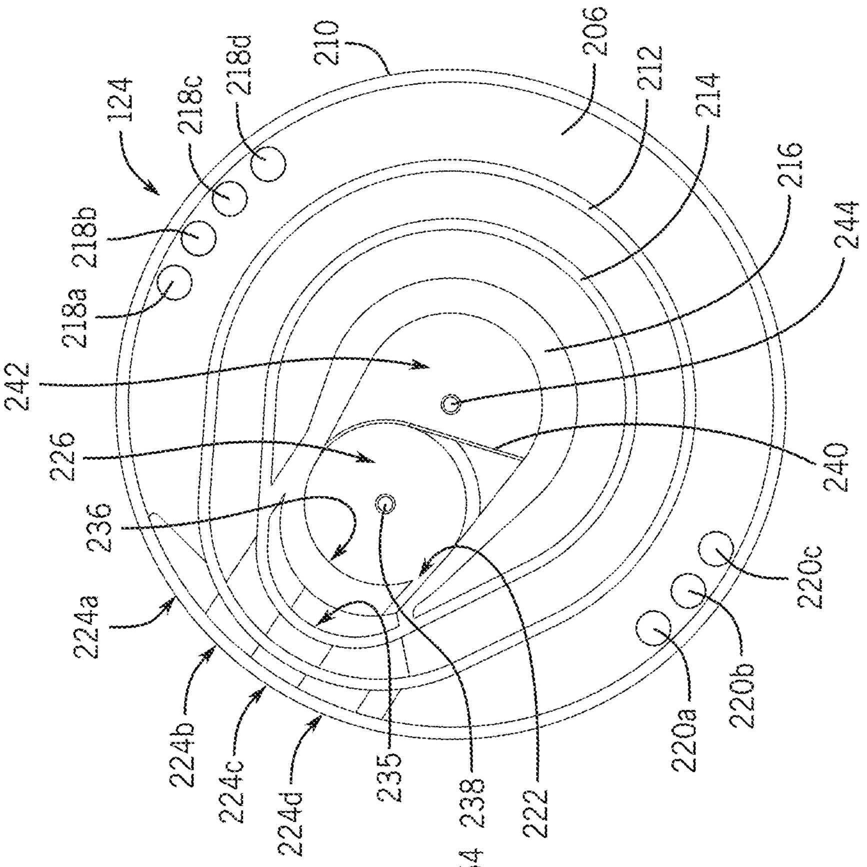
FIG. 4 is a bottom plan view of a back plate for the showerhead in accordance with an embodiment of the disclosure.

With reference to FIG. 2A and FIG. 4, the showerhead 100 may include a mounting or back plate 124 or massage plate. The back plate 124 may define a portion of a massage mode assembly 112 for the showerhead 100. The back plate 124 may include a front surface 206 and a rear surface 208, where the front surface 206 is oriented towards the intermediate plate 120 and the rear surface 208 is oriented towards the handle housing 122. The rear face 208 may include one or more securing tabs 228*a*, 228*b* that extend from the rear surface 208 and may define rotational stops for the engine 138. The rear face 208 may also include a boss 232 that extends upwards from the rear face 208 that may act to couple the back plate 124 to the housing 122. For example, the securing pillar 234 may be positioned within a center of the boss 232 such that an area between the outer surface of the securing pillar 234 and the boss 232 can receive a coupling feature, such as handle ring 134 therein.

A plurality of mode apertures 224*a*, 224*b*, 224*c*, 224*d* may be defined within the back plate 124, such as within a skirt 230 on an exterior wall of the back plate 124 and may extend into the back plate 124. In one example, the mode apertures 224*a*, 224*b*, 224*c*, 224*d* may be defined as apertures, tubes, or passages that deliver fluid from the engine inlet 136 of the handle housing 122 to the engine 138 and at different locations within the engine 138. The mode apertures 224*a*, 224*b*, 224*c*, 224*d* may have different lengths from one another, e.g., each may extend radially inward from an outer edge of the back plate 124 a different distance, to deliver fluid to different locations of the back plate 124, where the differing locations correspond to different modes.

With reference to FIG. 4, the back plate 124 may include an outer wall 210 or first wall 210 that defines an exterior perimeter of the back plate 124. The skirt 230 including the mode apertures 224*a*, 224*b*, 224*c*, 224*d* may be formed on the outer wall 210 to provide additional structural integrity for the first wall 210 to support the apertures 224*a*, 224*b*, 224*c*, 224*d*. In addition to the outer wall 210, the back plate 124, similar to the face plate 114 and the intermediate plate 120, may include a plurality of interior walls 212, 214, 216 that define separate fluid passageways corresponding to the different shower modes. The plurality of interior walls 212, 214, 216 may engage or interface with corresponding walls in the other plates to define fluidly separated passages through the engine 138. The various interior walls 212, 214, 216 may be defined radially inward from one another, e.g., a second wall 212 may be positioned closest to the first wall 210, the third wall 214 may be positioned between the second wall 212 and the fourth wall 216, with the fourth wall 216 or massage wall 216 be positioned closest to a center axis of the back plate 124. It should be noted that the interior walls 212, 214, 216 may be varying shapes, such as oblong or egg shaped, rather than cylindrical, where the shape may be selected based on a desired flow rate, nozzle configuration, and the like of the showerhead 100.

The interior walls 212, 214, 216 may generally be continuous, e.g., without breaks or holes, along their perimeters so as to prevent fluid from one pathway to enter into another pathway. In these instances the mode apertures 224*a*, 224*b*, 224*c*, 224*d* may be defined as tunnels or otherwise formed to open only into the desired mode wall and be sealed from the other walls.

In some embodiments, however, the massage wall or fourth wall 216 may be discontinuous or otherwise include an auxiliary inlet 222 that may be defined as a space between adjacent portions of the fourth wall 216 or as an aperture through the fourth wall 216. The auxiliary inlet 222 may have a cross-sectional shape generally shaped as a rectangle and defining a first width and a first length. A primary inlet 236 may be fluidly coupled to the massage mode inlet 224*b* and be defined as an aperture in the fourth wall 216. The primary inlet 236 may form the terminal end of the massage mode inlet 224*b*. In one embodiment, the primary inlet 236 may have a cross-sectional shape that may be circular and have a diameter that is larger than both the first length and the first width of the auxiliary inlet 222. In other words, the cross-sectional area for the primary inlet 236 may be larger than the cross-sectional area of the auxiliary inlet 222. Also, in some embodiments, the primary inlet 236 may have a different cross-sectional shape as compared to the auxiliary inlet 222 (e.g., circular versus rectangular), where the different shapes may assist during manufacture of the back plate 124, e.g., make it easier to injection mold the back plate 124, as well as be selected to have desired flow and orientation characteristics, as discussed in more detail below.

The third wall 216 may also define, in part with the front surface 206, a massage chamber 126, which may include a drive chamber 226 and a driven chamber 242. The drive chamber 226 and the driven chamber 242 may be defined as recessed portions forming compartments on the front surface of the back plate 124. The drive chamber 226 and the driven chamber 242 may be defined as raised portions on the back surface 208 of the back plate 124. In one example, the drive chamber 226 may define a deeper cavity than the driven chamber 242 in that it may be further recessed from the front surface 206 than the bottom surface of the driven chamber 242 (or alternatively further raised from the rear surface 208) defining a wall 240 therebetween. The massage chamber 126 may be defined as oblong or egg shaped compartment, with the driven chamber 242 having a wider diameter than the drive chamber 232.

Pin support features 238, 244, which may be defined as recessed portions, may be defined on the front surface 206 within the massage chamber 126, with a first pin support feature 238 being defined within the drive chamber 226 and the second pin support feature 244 being defined within the driven chamber 242. The two pin support features 238, 244 may be defined at a center of each chamber, respectively, e.g., aligned with a center axis of the drive chamber 226 and driven chamber 242, respectively.

With reference to FIGS. 2B and 4, in some embodiments, the back plate 124 may include mode detents 218*a*, 218*b*, 218*c*, 218*d*, 220*a*, 220*b*, 220*c* that may interact with a feedback assembly (not shown), such as a spring actuated pin, to provide feedback to the user as the user moves the engine 138 to change modes.

As mentioned, the back plate 124 may form a portion of the massage mode assembly 112. In addition, with reference to FIGS. 2A, 5A, and 5B, the massage mode assembly 112 may include a drive gear 130. The drive gear 130, which may be formed as a turbine, may include a turbine portion 254 and a gear portion 257, where the two portions 254, 257 may be integrally formed with one another or may be separate components. In embodiments where the turbine portion 254 and gear portion 257 are integrally formed, the drive gear 130 may be easier to manufacturer and assemble, as fewer parts may be required. In other embodiments, the turbine portion 254 may be omitted and the gear portion 257 may be used without such features, similarly, the gear portion 257 may be omitted and the turbine portion 254 may be used to directly drive the driven gear 132.

The turbine portion 254 may be configured to rotate the drive gear 130 based on impact from fluid. As such, the turbine portion 254 may include a plurality of paddles 256 that extend radially outwards and are spaced apart from one another. The paddles 256 may define a surface area to receive a water force, e.g., water stream, to exert a rotational force on the drive gear 130.

The gear portion 257 may be positioned beneath the turbine portion 254, e.g., closer to the spray face of the showerhead 100. In some embodiments, the gear portion 257 is positioned in a plane below the turbine portion 254 (e.g., vertically below when the showerhead nozzles are pointed downwards or relative to the back surface of the housing 122), and may be radially inset from an outer circumference of the turbine portion 254. In other words, the turbine portion 254 may be positioned upstream of the gear portion 257, which may correspond to an orientation (see FIG. 6A) where the gear portion 257 is vertically below the turbine portion 254, such as when the showerhead is facing down. As another example, a portion of the turbine portion 254 may be positioned out of plane with the gear portion 257. The drive gear 130 may include a plurality of teeth 260 that extend radially outwards from the gear portion 257. The teeth 260 may be spaced apart from one another and define a shape, such as a spur shape, to engage or mesh with corresponding teeth of a driven gear 132. The size and number of the teeth 260 may depend on the desired gear reduction between the drive gear 130 and driven gear 132, as well as a shape configured to increase or decrease an impingement force of water on the surface of the gears.

Figure 5A:
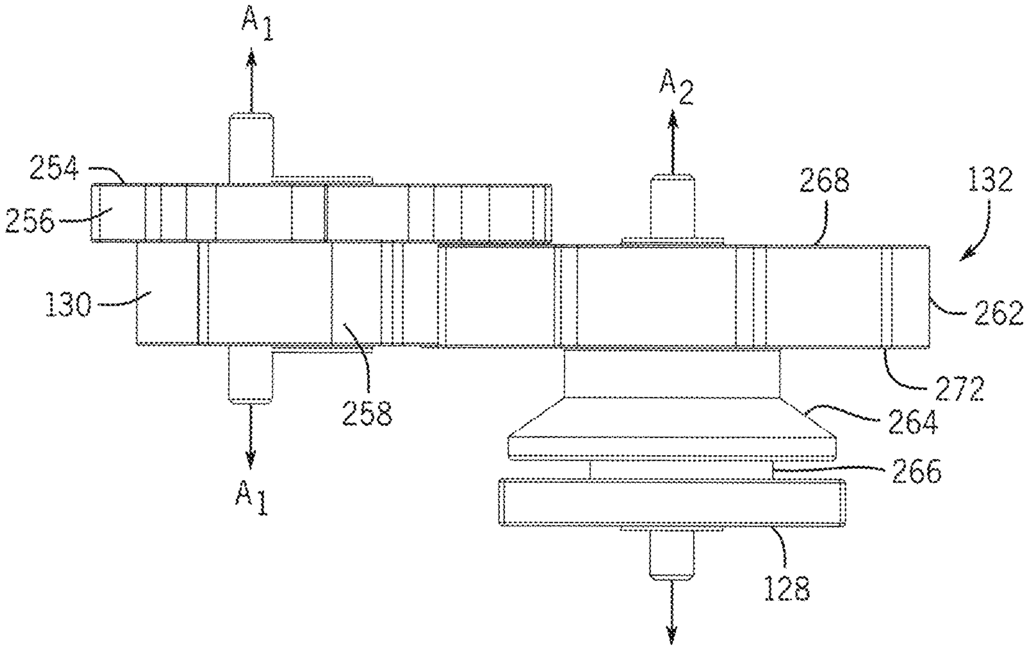
FIG. 5A is a front elevation view of a portion of a massage mode assembly for the showerhead in accordance with an embodiment of the disclosure.

The drive gear 130 may include a pin aperture 252 that defines an aperture through the body of the gear portion 257 and the turbine portion 254, and that may be aligned with a center axis A1 of the drive gear 130 (see FIG. 5A).

The driven gear 132 may include a plurality of teeth 262 that extend radially outwards and are configured to mesh with the teeth 260 of the drive gear 130. The driven gear 132 may include a top surface 268 and a bottom surface 272 opposite of the top surface 268.

A flange 264 may extend from the bottom surface 272 and transition to define a cam 266. In this embodiment, the cam 266 may be coupled to the driven gear 132 via the flange 264 or other connection member, such as a neck, and may be integrally formed therewith, but in other embodiments, the cam 266 may be a separate component coupled to the drive gear 132. The cam 266 is configured to convert rotation of the driven gear 132 into an oscillating motion or other reciprocating motion for another component. In one example, the cam 266 is formed as a circular surface offset from a center axis A2 of the driven gear 132.

A pin aperture 274 may be defined by the driven gear 132 and may be formed at a center of the driven gear 132, such as along the center axis A2 of the driven gear 132. The pin aperture 274 may extend through the length of the flange 264 and cam 266.

The massage assembly 112 may also include a shutter 128, which may be formed as a follower or shoe, that couples to the cam 266. The shutter 128 is configured to move to selectively block flow to one or more nozzles or nozzle pathways, such as nozzles 158*a*, 158*b*. The shutter 128 may include a cam aperture 278 defined therein, which may be generally an oval-shaped aperture defined an interior sidewall 280 of a body 286 of the shutter 128. The width of the cam aperture 280 may be selected to substantially match the diameter of the cam 266, but the length may be longer than the diameter of the cam 266.

The shutter 128 may be a substantially planar disc having a generally oval shaped body 286, with two constraining edges 282*a*, 282*b* formed on opposing ends. The constraining edges 282*a*, 282*b* may be formed as straight walls and connected via two curved edges 284*a*, 284*b*. The curved edges 284*a*, 284*b* may define longitudinal edges of the shutter 128 and the constraining edges 282*a*, 282*b* may form the lateral edges of the shutter 128.

With reference to FIGS. 2A-3, components of the showerhead 100 may be coupled together in various manners. In one example, the engine 138 may be assembled and then may be rotatably coupled to the housing 122. For example, the face plate 114 may be secured to the cover 110, such that the nozzles 156*a*, 158*a*, 158*b* may extend through or otherwise align with the corresponding apertures 150, 152*a*, 152*b*, on the cover 110. For example, nozzles 156 may extend through nozzle apertures 150 and massage mode nozzles 158*a*, 158*b* may extend through a respective nozzle aperture 152*a*, 152*b*. Additionally, securing elements, such as tabs, prongs, or the like, may secure the two plates together, e.g., tabs on the face plate 114 may seat within notches or apertures on the cover 110, such as notches that are defined an outer perimeter wall of the cover 110. In many embodiments, face plate 114 may be positioned within the cover 110, such that the cover 110 forms an exterior of the spray face for the showerhead 100.

While some nozzles, e.g., nozzles 156, 158*a*, 158*b*, may be formed on the face plate 114, some nozzles, may be defined by a separate component, such as nozzle rings 116. In these embodiments, the nozzle rings 116 may be coupled to the face plate 114 and the nozzle portions may extend through nozzle apertures in the face plate 114 and continue through nozzle apertures, such as apertures 153, 154 in the cover 110. In other embodiments, all the nozzles may be defined by the one or more plates or alternatively by one or more nozzle rings that insert through nozzle apertures within the plates. It should be noted that the term nozzle as used herein is meant to encompass embodiments where the nozzles are formed by both the plates and the nozzle rings, as well as those where the nozzles may be formed by one or the other. The nozzle rings 116 may be positioned within one or more of the flow pathways defined by the walls 160, 162, 164, 166 of the face plate 114. Similarly, the mist plate 118 may be seated within and coupled to the face plate 114.

The intermediate plate 120 may then be coupled to the face plate 114. The two plates 114, 120 may be aligned such that plate walls align to define fluid pathways between the two plates. For example, the first wall 180 of the intermediate plate 120 may align and engage with the first wall 160 of the face plate 114, the second wall 182 of the intermediate plate 120 may align with and engage the second wall 162 of the face plate, the third wall 184 of the intermediate plate 120 may align with and engage the third wall 164 of the face plate 114. The fourth wall 186 of the intermediate plate 120 may align with and engage the fourth wall 166 of the face plate 114. The massage aperture 193 of the intermediate plate 120 generally aligns with and is positioned over the massage mode chamber 168 defined in the face plate 114. As shown in FIG. 3, in some embodiments, the massage aperture 193 may be smaller than the massage mode chamber 168, such that a surface or portion of the intermediate plate 120 may extend over and partially cover a portion of the massage mode chamber 168. As will be discussed below, this portion of the intermediate plate 120 may support components of the massage mode assembly 112 and help define a desired alignment and orientation between select components. The connection between the various walls defines isolated flow pathways that deliver water to different groups of nozzles and define the different modes of the showerhead.

Figure 5B:
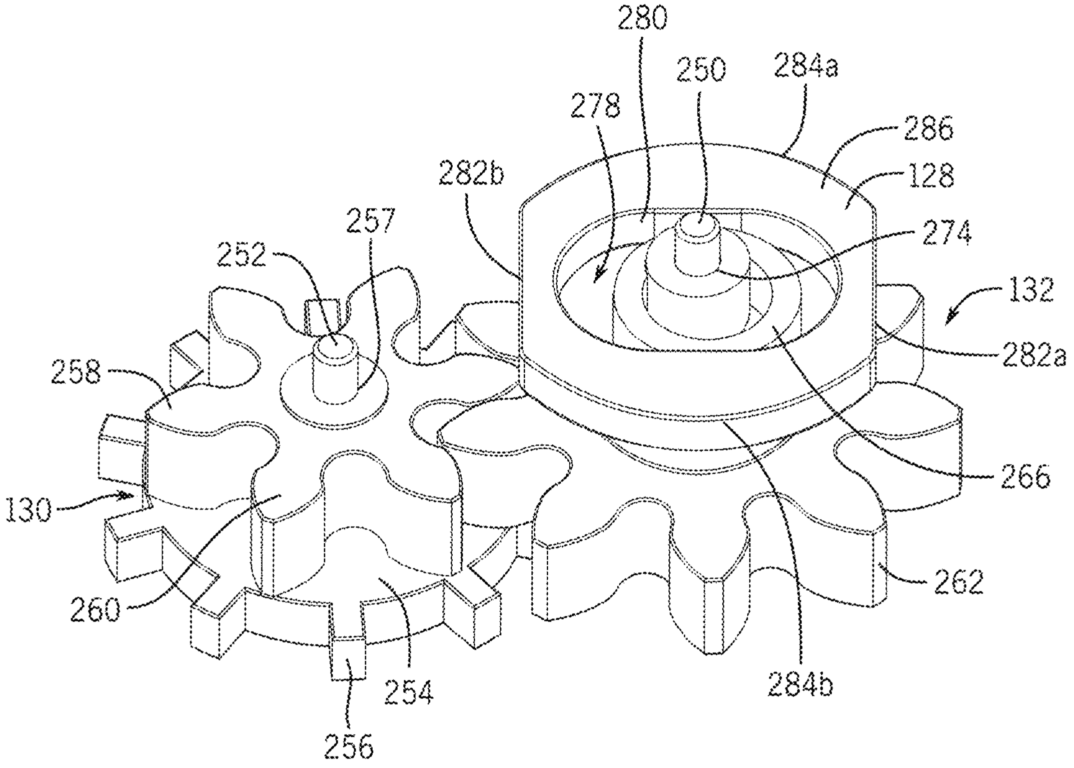
FIG. 5B is a bottom isometric view of a portion of the massage mode assembly for the showerhead in accordance with an embodiment of the disclosure.

With reference to FIGS. 2B, 3, and 5B, the massage mode assembly 112 may be coupled to one or more plates within the engine 138. For example, the shutter 128 may be positioned within the massage mode chamber 168 of the face plate 114. More specifically, the shutter 128 may be positioned such that the constraining edges 282*a*, 282*b* are oriented towards and contact a respective constraining wall 170*a*, 170*b* and the rounded edges 284*a*, 284*b* are oriented towards and contact the other ends of the massage mode chamber 168. In this manner, the shutter 128 may be positioned such that the shutter body 286 is covering or blocking one or more nozzle outlets within each bank of nozzles 158*a*, 158*b* and can be moved, but in a predefined manner, within the massage mode chamber 168 to selectively block and unblock the nozzles outlets within the nozzles 158*a*, 158*b*.

With reference to FIGS. 3 and 5B, the drive gear 132 may be coupled to the shutter 128. For example, the cam 266 may be positioned within the cam aperture 278 of the shutter 128, such that the interior sidewall 280 of the shutter 128 contacts a portion of the cam 266 and the shutter 128 will be configured to move based on movement of the cam 266.

The pin 250 is inserted through the pin aperture 274 of the driven gear 132 and positioned in the pin support feature 165 defined on the face plate 114 within the massage mode chamber 168. The pin 250 is aligned with the center axis A2 of the driven gear 132, which may be aligned with a center of the face plate 114, e.g., the center axis A2 may correspond to the center axis CA of the face plate 114 and the spray face of the showerhead 100. The alignment of the center axis A2 with the center axis CA of the spray face of the showerhead 100 may allow the shutter 128 to block nozzles on adjacent sides of the center axis CA and define symmetrical alternating water pulses. However, in other embodiments, the center axis A2 may be aligned at other locations relative to the face plate 114, cover 110, and/or spray face.

In some embodiments, the center axis A1 may be offset from the center axis CA of the engine 138 or massage chamber 168 and center axis A2 may be aligned with and centered on the center axis CA of the engine 138 and massage chamber 168. In this configuration, the driven gear 132 may be concentric with the center axis of the engine the massage chamber 168 of the front plate 110, while the drive gear 130 may not be concentric with the center axis CA of the engine 138 or massage chamber 168 of the cover 110.

The two different axis A1, A2, of the massage mode assembly 112, allow the massage mode outlets, e.g., outlets in nozzle banks 158*a*, 158*b*, to be positioned generally in a center of the cover 110, but with an overall reduced height or thickness of the showerhead 100 and specifically the engine 138. For example, in some embodiments, the drive gear 130 could be positioned such that the center axis A1 is aligned with the center axis A2, but this would increase the overall height of the engine 138 as both the driven gear 132 and drive 130 would be stacked directly vertically over one another. This may make the showerhead 100 bulky and difficult to store and handle by a user. On the contrary, the lateral or in plane arrangement of the gears 130, 132 allows the engine 138 to be thinner and easier to use, while also allowing the massage nozzles 158*a*, 158*b* to be positioned in a center of the cover 110. Similarly, the slight overlap between the turbine portion 254 of the drive gear 130 with the driven gear 132, reduces the length or width of the engine 138, while still providing the desired gear reduction and other benefits of massage mode assembly 112.

The drive gear 130 may be coupled to the driven gear 132. For example, the teeth 258 of the drive gear 130 may be engaged with the teeth 262 of the driven gear 132 such that the teeth mesh together, allowing the drive gear 130 to rotate the driven gear 132. The turbine portion 254 of the drive gear 130 may be positioned so as to extend vertically and laterally over a portion of the top surface 268 of the driven gear 132. For example, as shown in FIG. 5A, the turbine portion 254 may overlap such that a portion of the top surface 268 of the driven gear 132 is directly beneath the turbine portion 254, with the portion of the turbine portion 254 extending over the meshed engagement of the teeth 258, 262 of the two gears 130, 132. The drive gear 130 may be supported on a portion of the intermediate plate 120 and the pin 252 is received within the pin support 195 of the intermediate plate 120.

With the drive gear 130 and drive gear 132 coupled together, the back plate 124 may be positioned such that the second end of pin 250 is positioned within pin feature 244 and the second end of pin 252 is positioned within pin feature 238 defined on the bottom surface of the back plate 124. In this manner, the drive gear 130 and drive gear 132 are positioned at least in part within the massage chamber 242, with the two respective pins 250, 252 defining rotational axis of the respective drive gear 130 and drive gear 132. The back plate 124 may be positioned over the intermediate plate 120 such that corresponding walls align with one another, e.g., the first wall 194 of the top surface of the intermediate plate 120 may be aligned with the first wall 210 of the back plate 124, the second wall 196 of the top surface of the intermediate plate 120 may be aligned with the second wall 212 of the back plate 124, the third wall 198 of the intermediate plate 120 may be aligned with the third wall 214 of the back plate 124, and the fourth wall 200 of the intermediate plate 120 may be aligned with the fourth wall 216 of the back plate 124. The interaction and alignment of the walls on the top surface of the intermediate plate 120 with the walls on the bottom surface of the back plate 124 define separate fluid passages that direct fluid through the engine 138 to different nozzles, e.g., define spray modes for the showerhead 100 The back plate 124, black plate 120, face plate 114, and cover 110 may all be secured together, such that movement of the cover 110 will cause the other plates 114, 120, 124 to move correspondingly. Additionally, securing the plates together defines the engine 138 of the showerhead 100, which may then be coupled to the housing 122.

Specifically, with reference again to FIGS. 2A and 6A, the handle ring 134 receives the securing pillar 234 and is positioned within the boss 232. A mode seal 133 is positioned adjacent a lip defining the engine inlet 136. The engine 138 is positioned within the engine compartment 144 with the mode seal 133 engaging the front surface of the skirt 230 on the back plate 124. As can be understood, the mode seal 133 includes a mode aperture 131, which can be aligned with the various mode apertures 224*a*, 224*b*, 224*c*, 224*d* and/or the face of the skirt 230 to select one or more modes of the showerhead 100. The engine 138 may be coupled to the housing 122 such that the engine 138 is movable, e.g., rotatable, relative to the housing 122.

In operation, water flows from a water source, e.g., hose or J-pipe, into the handle inlet 108. The water then flows through the engine inlet 136, the mode aperture 131 of the mode seal 133, and into the engine 138. Specifically, the water may flow into one or more of the mode apertures 224*a*, 224*b*, 224*c* that are aligned with the mode aperture 131 of the mode seal 133. In some embodiments, two apertures may be fluidly connected at the same time, e.g., partially aligned with the mode aperture 131, which may act to split the fluid into two different modes.

In a first massage mode, the user manipulates the engine 138, such as by exerting a force on control feature 142, so as to reposition the engine 138 and the skirt 230 of the back plate 124 relative to the mode seal aperture 131. Specifically, the engine 138 is aligned such that mode aperture 224*b*, which may correspond to a first massage mode aperture, is aligned with the massage mode aperture 131. Water then flows from the engine inlet 136 into the mode aperture 224*b*, which is fluidly connected to the massage chamber 242. With reference to FIGS. 6B and 6C, the fluid F then flows into the massage chamber 242 via primary inlet 236 and impacts the drive gear 130, causing the drive gear 130 to rotate. In embodiments where the drive gear 130 includes the turbine portion 254, the fluid F impacts the paddles 256, exerting a rotational force on the drive gear 130. Additionally, fluid F also impacts the gear teeth 258 as well, assisting in rotating the drive gear 130. In other embodiments, the turbine portion 254 may be omitted, instead relying on the rotational force exerted by the fluid F on the gear teeth 258. However, the additional force generated by the paddles 256 may act to increase the torque generated, which can improve the massage force of the showerhead 100.

Figure 6A:
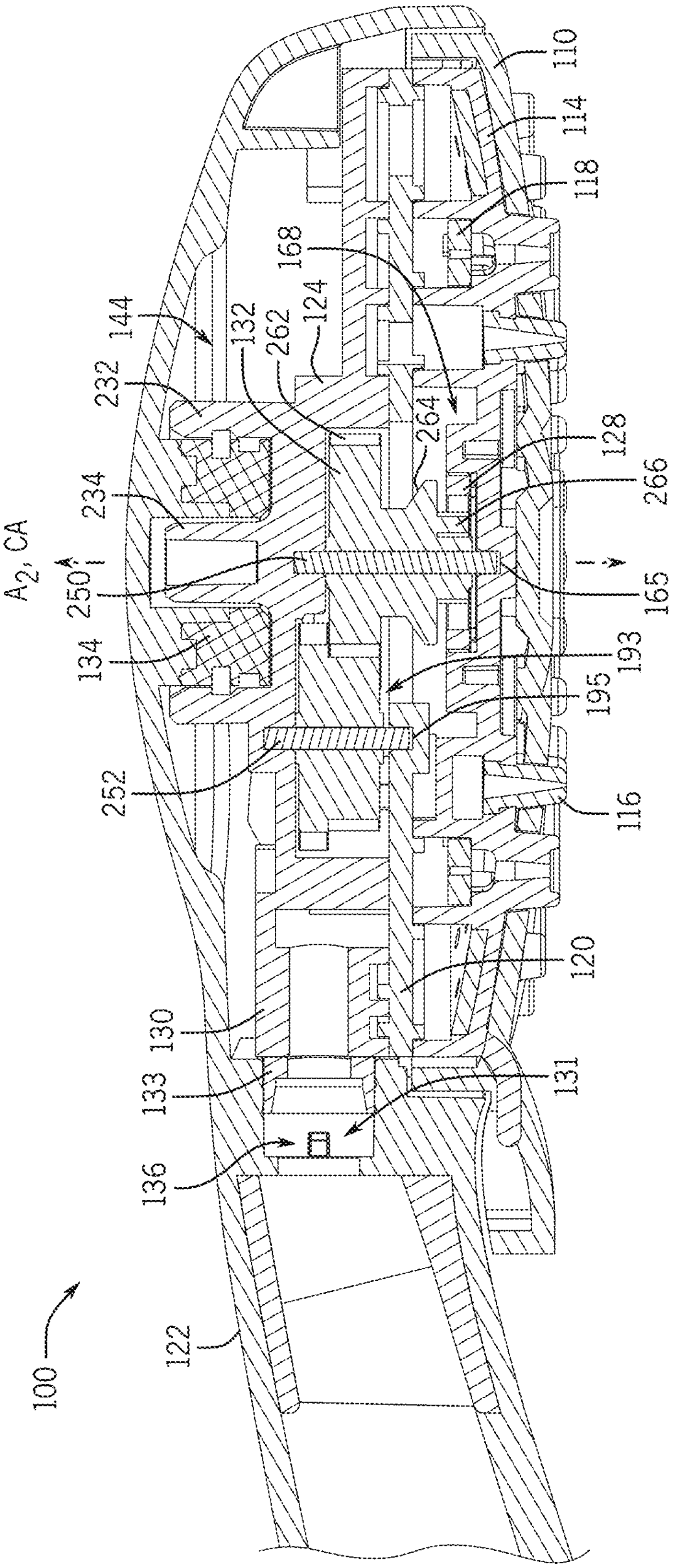
FIG. 6A is an enlarged cross-sectional view of the showerhead taken along line 6A-6A in FIG. 1B.
Figure 6B:
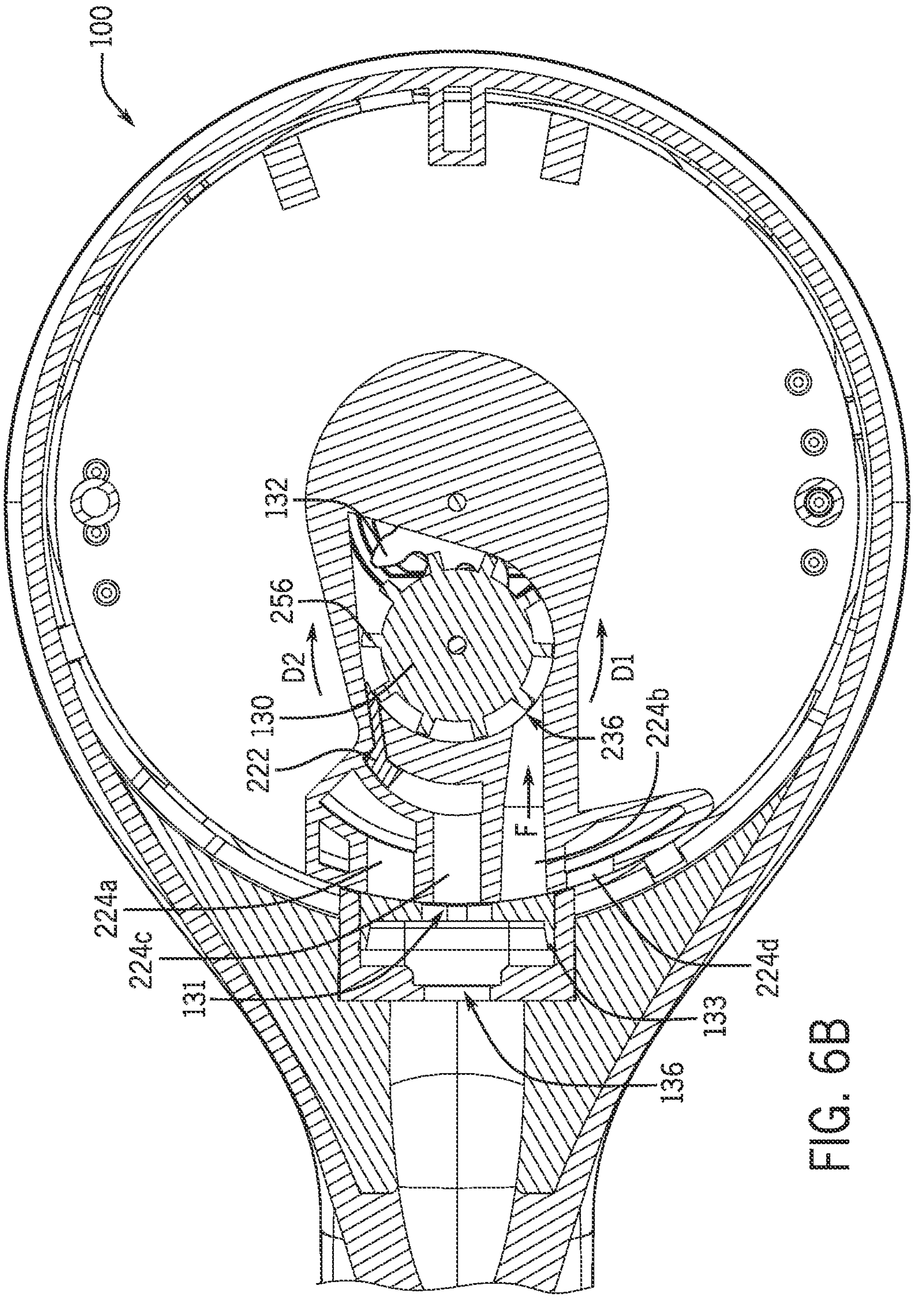
FIG. 6B is an enlarged cross-sectional view of the showerhead taken along line 6B-6B in FIG. 1C.
Figure 6C:
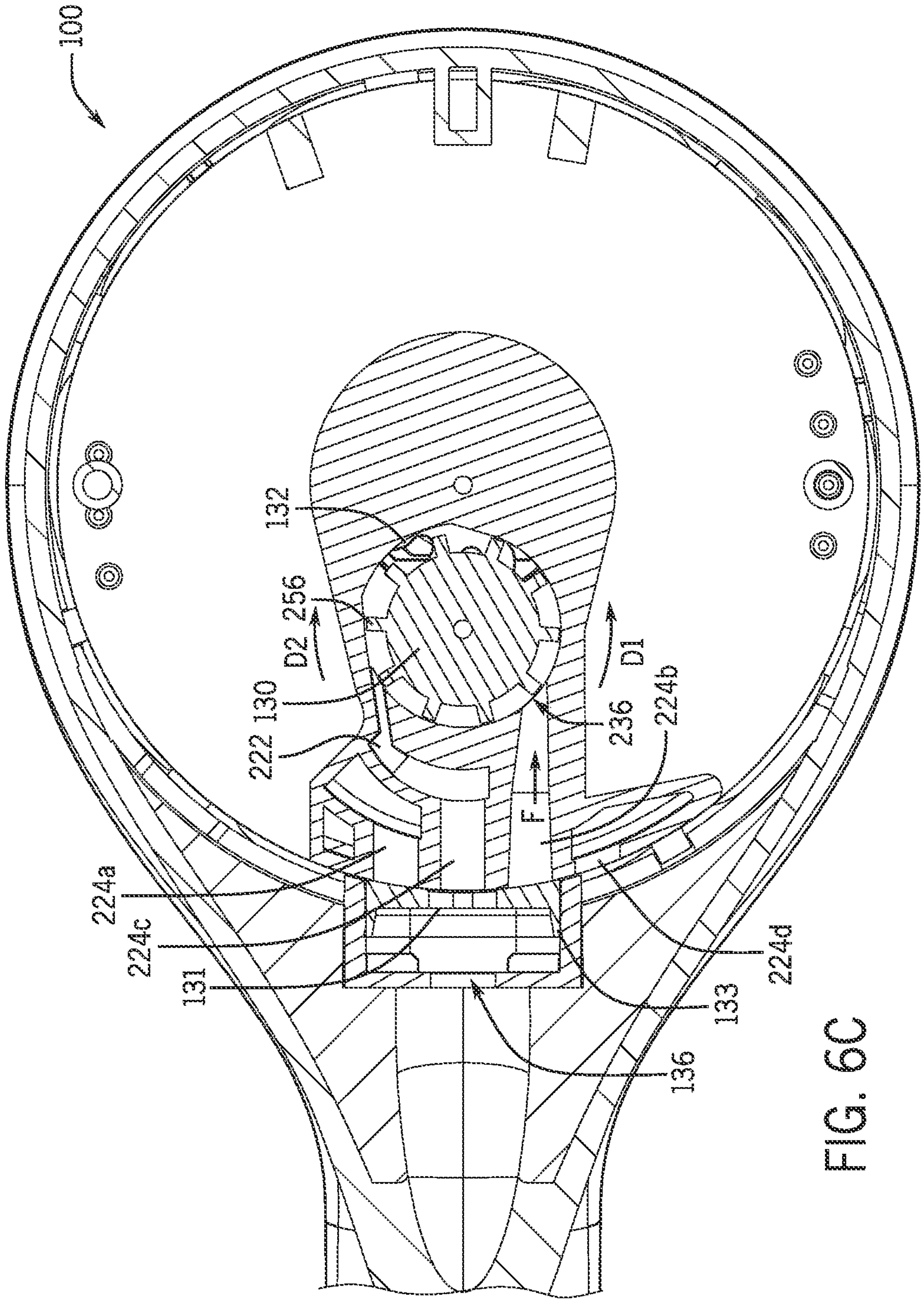
FIG. 6C is an enlarged cross-sectional view of the showerhead taken in the same direction but along a different plane from FIG. 6B.

With continued reference to FIGS. 6A-6C, the drive gear 130 rotates about center axis A1 and in a first direction D1, and the engagement between the driven gear 132 and the drive gear 130 causes the driven gear 132 to rotate about center axis A2. Specifically, the teeth 258 of the drive gear 130 mesh with the teeth 262 of the drive gear 132, causing the driven gear 132 to rotate. However, the different number of gear teeth 258, 262 between the drive gear 130 and the driven gear 132 acts as a gear reduction to slow the rotational rate of the driven gear 132. In other words, the driven gear 132 rotates slower than the drive gear 130.

As the driven gear 132 rotates, the cam 266 moves the shutter 128. Due to the eccentricity of the cam 266, the shutter 128 moves around the center axis A2 in an oscillating motion. Additionally, the movement of the shutter 128 is constrained by the constraining walls 170*a*, 170*b* of the face plate 114. As such that the shutter 128 may move in a substantially a linear, reciprocating manner. This motion of the shutter 128 causes the shutter 128 to selectively block and unblock nozzles within nozzle banks 158*a*, 158*b*. In one example, all of the nozzle apertures or outlets in each nozzle bank 158*a*, 158*b*, such as nozzle bank 158*a*, open substantially simultaneously and close simultaneously with one another. In this manner, each nozzle bank 158*a*, 158*b* may be "on" or "off" (connected or disconnected from the fluid source) depending on the location of the shutter 128, without transition nozzles that taper down or ramp up flow between the two banks 158*a*, 158*b*. The gear reduction provided by the interaction of the drive gear 130 and the driven gear 132, causes the shutter 128 to move linearly within the massage mode chamber 168, but at a slower rate than a direct connection to the turbine, i.e., the shutter 128 moves slower than if it was directly connected to the drive gear 130. This reduced movement rate, increases the force exerted by the fluid exiting the nozzle banks 158*a*, 158*b*, as each bank 158*a*, 158*b* may be "on" for a longer period of time generating larger pulses of water that impact the user. This force increase may be generated, even if the water flow rate through the showerhead is the same as conventional massage modes.

In a second massage mode, the user may manipulate the engine 138 to align the mode aperture 224*c* with the mode seal aperture 131. In this position, fluid may exit into the back plate 124 via mode outlet 235, which is fluidly connected to auxiliary inlet 222 (see FIG. 6C). Auxiliary inlet 222 is fluidly connected to the massage chamber 242, but has a varied diameter and/or cross-section as compared to primary inlet 236. The auxiliary inlet 222 directs fluid towards the drive gear 130, but a different orientation from the primary inlet 236. The different shape characteristics and orientation of the auxiliary inlet 222 relative to the primary inlet 236 causes the drive gear 130 to rotate at a different rotational rate and a different or opposite direction (e.g., second direction D2) than in the first massage mode, e.g., at a slower rotational rate. This causes the shutter 128 to move slower than in the first massage mode, causing an increased force output by the nozzle banks 158*a*, 158*b*. In some embodiments, the auxiliary inlet 222 or port may be two to ten times and in some instances eight times smaller in diameter or cross section as the primary inlet 236. This second mode may also be set as a pause mode, such as by further reducing the cross-sectional area of the auxiliary inlet 222, which can act to effectively "pause" the showerhead, as flow from the inlet reaching the nozzles may be constrained by the reduced dimeter of the auxiliary inlet 222.

In a third massage mode, the user may manipulate the engine 138 such that both mode apertures 224*b*, 224*c* are fluidly coupled to the mode aperture 131 and engine inlet 136, e.g., the engine 138 may be positioned such at each mode aperture 224*b*, 224*c* is partially "open" relative to the mode aperture 131. In this orientation, fluid may flow into the massage chamber 242 via both the primary inlet 236 and the auxiliary inlet 222. This causes the drive gear 130 to rotate in the first direction D1, but at slower rotational rate than in the first massage mode. The smaller cross-sectional area and shape of the auxiliary inlet 222 may be selected to help avoid the drive gear 130 from stalling out due to the water impacting it from two different directions. In this configuration, the fluid from the auxiliary inlet 222 acts to add resistance to the torque due to the primary inlet 236, without reducing the amount of water moving through the system. That is, the auxiliary inlet 222 acts to slow down the shutter 128, but allow the same water flow to be expelled via the nozzles 158*a*, 158*b*.

In some embodiments, the third massage mode may be considered an "intermediate" or transition mode and be configured to allow a user to selectively adjust the force exerted by the massage mode assembly 112. In other words, by adjusting the amount of flow into the auxiliary inlet 222, the user can continuously increase or decrease the rotational rate of the drive gear 130, which can decrease or increase, respectively, the force exerted by the out flow from the nozzles 158*a*, 158*b*. In this manner, the massage mode 112 can be configured to offer a continuum of force for the user, allowing the user to easily tailor the desired massage force to his or her preferences. In other embodiments, the engine 138 may include stops or positioning features that define incremental or selected positions relative to the massage mode aperture 131. The engine 138 may have predefined positions that define selected force levels, e.g., level 1, level 2, level 3, that are selectable by a user, rather than a continuum. This feature may be less customizable by the user but can allow a user to more easily return to a desired force level, e.g., the user may not have to keep tweaking the position of the engine 138 to find the last desired level, but can simply position the engine at the predetermined level. The force adjustment allows the showerhead 100 to provide multiple massage intensities, e.g., force levels, through the same nozzles, such as nozzles within nozzle banks 158*a*, 158*b*.

All relative and directional references (including top, bottom, side, front, rear, and so forth) are given by way of example to aid the reader's understanding of the examples described herein. They should not be read to be requirements or limitations, particularly as to the position, orientation, or use unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other, unless specifically set forth in the claims.

The present disclosure teaches by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A showerhead comprising:
- a housing defining a chamber in fluid communication with a fluid inlet; and
- a massage mode assembly received within the chamber, the massage mode assembly comprising:
  - a drive gear comprising a plurality of drive teeth, wherein the drive gear rotates due to fluid from the fluid inlet impacting the drive gear;
  - a driven gear comprising a plurality of driven teeth that mesh with the drive teeth of the drive gear, such that movement of the drive gear causes the driven gear to rotate, wherein the drive gear rotates faster than the driven gear rotates to selectively direct fluid from the fluid inlet to one or more nozzles;
- a mode selector positioned between the fluid inlet and the massage mode assembly, wherein:
  - the mode selector directs fluid from the fluid inlet into the massage mode assembly;
  - in a first configuration, the mode selector directs fluid at a first orientation relative to the drive gear causing the drive gear to rotate in a first direction;
  - in a second configuration, the mode selector directs fluid at both a second orientation relative to the drive gear and at the first orientation relative to the drive gear, causing the drive gear to rotate in the first direction at a rate less than in the first configuration; and
  - in a third configuration, the mode selector directs fluid at the second orientation relative to the drive gear, causing the drive gear to rotate in a second direction, opposite of the first direction.

2. The showerhead of claim 1, wherein the drive gear further comprises a plurality of paddles, wherein the fluid from the fluid inlet impacts both the drive teeth and the plurality of paddles to rotate the drive gear.

3. The showerhead of claim 2, wherein the plurality of paddles are shaped differently from the drive teeth.

4. The showerhead of claim 2, wherein the fluid impacts the plurality of paddles and the drive teeth from a first massage mode inlet.

5. The showerhead of claim 1, wherein a rotational axis of the drive gear is offset from a center axis of the chamber and a rotational axis of the driven gear is aligned with the center axis of the chamber.

6. The showerhead of claim 1, wherein the driven gear is concentric relative to a center axis of the chamber and the drive gear is not concentric relative to the center axis of the chamber, and further comprising a cover that defines the one or more nozzles, wherein the cover comprises a center axis aligned with the center axis of the chamber.

7. The showerhead of claim 1, wherein a portion of the drive gear is positioned vertically above and extends laterally over a portion of the driven gear.

8. The showerhead of claim 1, further comprising a cover including the one or more nozzles, wherein the drive gear has a rotational axis offset from a center axis of the cover.

9. The showerhead of claim 1, further comprising:
- a cam connected to the driven gear; and
- a shutter connected to the cam, wherein as the driven gear rotates, the cam rotates, causing the shutter to open and close the one or more nozzles.

10. The showerhead of claim 1, wherein the massage mode assembly further comprises a massage mode housing comprising a first inlet and a second inlet, wherein the first inlet has a first cross-sectional shape and the second inlet has a second cross-sectional shape different from the first cross-sectional shape.

11. A showerhead comprising:
- a housing defining a housing center axis and in fluid communication with a fluid inlet;
- an engine positioned within the housing and in fluid communication with the fluid inlet, the engine comprising:
  - a drive gear configured to be rotated along a first rotational axis offset from the housing center axis;
  - a driven gear coupled to the drive gear and configured to be rotated along a second rotational axis, different from the first rotational axis;
- a nozzle plate coupled to the engine and in fluid communication therewith, the nozzle plate comprising a plurality of massage mode nozzles;
- wherein in a first mode, fluid from the fluid inlet impacts the drive gear, causing the drive gear to rotate to selectively direct fluid from the fluid inlet to one or more of the plurality of massage mode nozzles;
- a mode selector positioned between the fluid inlet and the engine, wherein:
  - the mode selector directs fluid from the fluid inlet into the engine;
  - in a first configuration, the mode selector directs fluid at a first orientation relative to the drive gear causing the drive gear to rotate in a first direction;
  - in a second configuration, the mode selector directs fluid at both a second orientation relative to the drive gear and at the first orientation relative to the drive gear, causing the drive gear to rotate in the first direction at a rate less than in the first configuration; and
  - in a third configuration, the mode selector directs fluid at the second orientation relative to the drive gear, causing the drive gear to rotate in a second direction, opposite of the first direction.

12. The showerhead of claim 11, wherein:
- the drive gear comprises a plurality of paddles and a plurality of drive gear teeth; and
- the driven gear comprises a plurality of driven gear teeth that mesh with the drive gear teeth, wherein in the first mode the fluid from the fluid inlet impacts the paddles to rotate the drive gear.

13. The showerhead of claim 12, wherein in the first mode, the fluid from the fluid inlet impacts the paddles and the plurality of drive gear teeth.

14. The showerhead of claim 12, wherein the paddles extend over a portion of the driven gear.

15. The showerhead of claim 11, wherein the drive gear is laterally offset from the driven gear and arranged to extend vertically above a top surface of the driven gear.

* * * * *